United States Patent

[11] 3,581,634

| | | |
|---|---|---|
| [72] | Inventor | Wolfgang Ort |
| | | Stuttgart-Bad Cannstatt, Germany |
| [21] | Appl. No. | 773,120 |
| [22] | Filed | Nov. 4, 1968 |
| [45] | Patented | June 1, 1971 |
| [73] | Assignee | Eastman Kodak Company |
| | | Rochester, N.Y. |
| [32] | Priority | Mar. 21, 1968 |
| [33] | | Germany |
| [31] | | P 17 72 019.3 |

[54] PHOTOGRAPHIC CAMERA WITH AN ELECTRONIC SHUTTER SPEED CONTROL
3 Claims, 4 Drawing Figs.

[52] U.S. Cl. ........................... 95/10, 95/53
[51] Int. Cl. ........................... G03b 7/08, G03b 9/08
[50] Field of Search ........................... 95/10 C, 53

[56] References Cited

UNITED STATES PATENTS

| 3,397,629 | 8/1968 | Mori et al. | 95/10(C) |
| 3,460,450 | 8/1969 | Ogihara | 95/10(C) |
| 3,463,072 | 8/1969 | Kiper et al. | 95/53 |
| 3,502,010 | 3/1970 | Kennel | 95/10(C) |

FOREIGN PATENTS

| 1,467,424 | 12/1966 | France | 95/10(C) |
| 1,093,731 | 12/1967 | Great Britain | 95/10(C) |

Primary Examiner—Samuel S. Matthews
Assistant Examiner—Joseph F. Peters, Jr.
Attorneys—Robert W. Hampton and Daniel E. Sragow ABSTRACT: A preindicator for an electromagnetically controlled shutter having a lamp connected to the electromagnet so as to glow when the electromagnet is energized. Also provided is a switch to enable the operator to operate the shutter control without opening the shutter.

WOLFGANG ORT
INVENTOR.

ATTORNEYS

WOLFGANG ORT
INVENTOR.

BY
ATTORNEYS

PHOTOGRAPHIC CAMERA WITH AN ELECTRONIC SHUTTER SPEED CONTROL

BACKGROUND OF THE INVENTION

1. Field of the Invention

The invention relates to a camera having means for electronically controlling the shutter speed on an integrating basis, and means for actuating a preferably optical preindicator related to an exposure control function for the planned exposure.

2. Description of the Prior Art

Cameras having an electronically controlled shutter mechanism are already known in various embodiments. In the beginning it turned out to be disadvantageous that the operator did not know the shutter speed to be expected under the prevailing scene lighting conditions for each of his planned exposures, a fact that easily led for instance to blurred images when hand-held exposures were taken. For this reason devices were used which, by means of additional circuit elements in the electronic shutter control circuit, permitted a binary indication of whether the exposure time to be expected was above or below a value satisfactory for hand-held photography. In one of these devices, a driving mechanism was connected in the electric circuit of the charging capacitor of the electronic timing device and its magnet. The driving mechanism controlled a lamp circuit before taking an exposure so as to give a digital indication of whether the exposure time which could be expected was shorter or longer than the predetermined limit.

The methods of operation of these known indicating devices all have in common that certain time limits are given and optical signals indicate only whether the exposure time expected for an exposure will be beyond such a limit or not. The exposure time limit being determined thereby is the limit up to which it is considered as likely that hand-held shots will not be blurred.

Electronic shutters are superior to conventional mechanical shutters mainly in the field of longer exposure times since they can control correctly and satisfactorily and at a reasonable expense exposure times of up to 30 seconds, a period which is unattainable by the mechanical shutters in amateur cameras. For this reason, the use of electronic shutters is, particularly advantageous in long time exposures taken from a tripod.

The problem arises, however, as to whether in cases of very low subject brightness the light conditions are sufficient to cause the opened camera shutter to close again, since all electronic shutters necessitate a minimum illumination density below which their electronic device cannot integrate according to its function. As a result, the shutter stays open for an uncontrolled period of time whereby even the effect of any manipulation by the photographer from outside the camera to cause the shutter to close is accidental and faulty exposures cannot be precluded. The operator sometimes does not even know whether the shutter is still open or closed again, for instance in the case of loud surrounding noises which cover the relatively low noise caused by the shutter action so that they cannot be heard.

SUMMARY OF THE INVENTION

It is the object of the invention to make up for the above deficiencies. This purpose is achieved, in cameras of the above-identified type comprising a test key, in an advantageous and simple way in that, upon actuating the test key, the exposing process for a photographic exposure is only simulated, with the camera shutter remaining closed and the electronic control device being activated by means of switches additionally provided in it and associated only with the test key, and said electric control system indicates the duration through a signal, depending on illumination, of the exposure time controlled by the electronic control device, i.e., the exposure time that would be taken by an actual exposure.

The considerable advantage resulting therefrom is that longer exposures can be taken without running the risk of a faulty exposure. Another advantage of the device according to the invention consists in that to obtain the highest possible depth of field the smallest aperture at which the shutter can be closed can be previously determined.

It is proposed to use a lamp which is preferably connected in parallel with the magnet system provided for keeping the shutter open for signaling the end of a simulated exposure.

BRIEF DESCRIPTION OF THE DRAWING

Reference is now made to the schematic drawing showing an embodiment according to the invention on the basis of which the invention is further described and illustrated in the following description by indicating further details and variations. For the purpose of clarification, all parts which do not pertain to the invention are left out of the drawing.

DESCRIPTION OF THE PREFERRED EMBODIMENT

Figure 1:
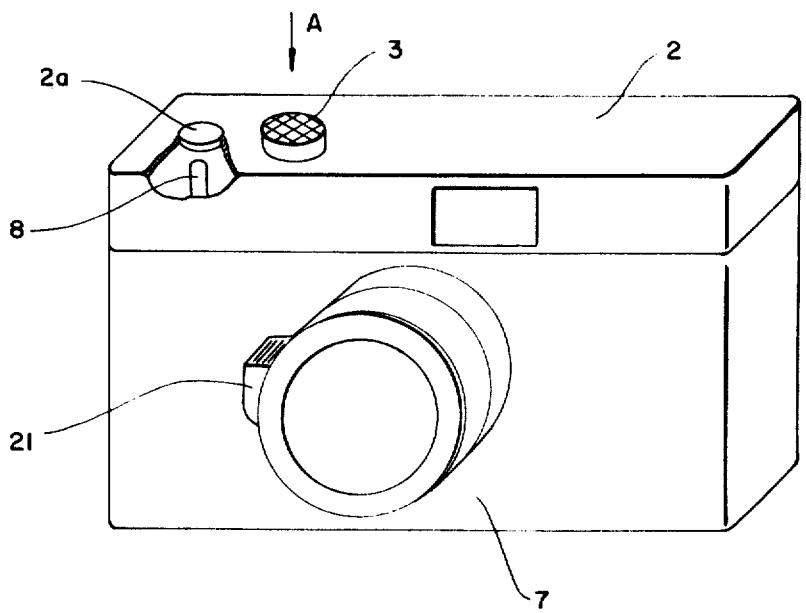
FIG. 1 shows the location of the test key and the control lamp on a photographic camera.

In FIG. 1 a camera is represented having a test key 3 on the top side 2 and a signal lamp 8 under a glass cover 2a.

Figure 2:
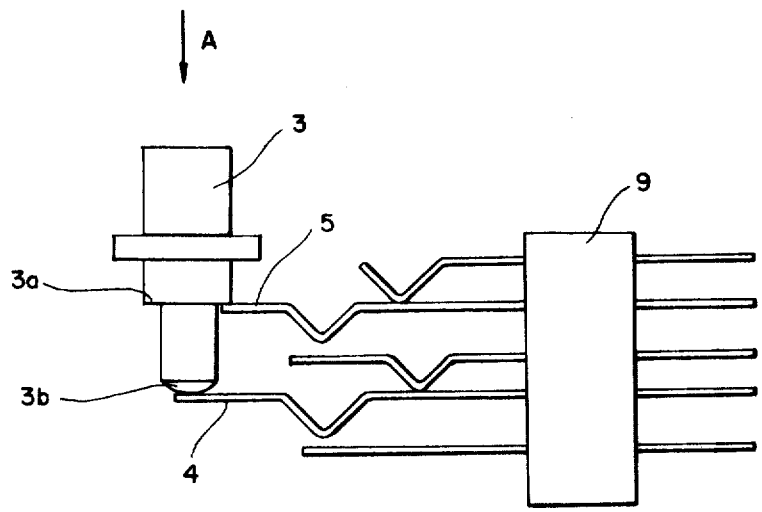
FIG. 2 shows the test key with an associated switch assembly.
Figure 3:
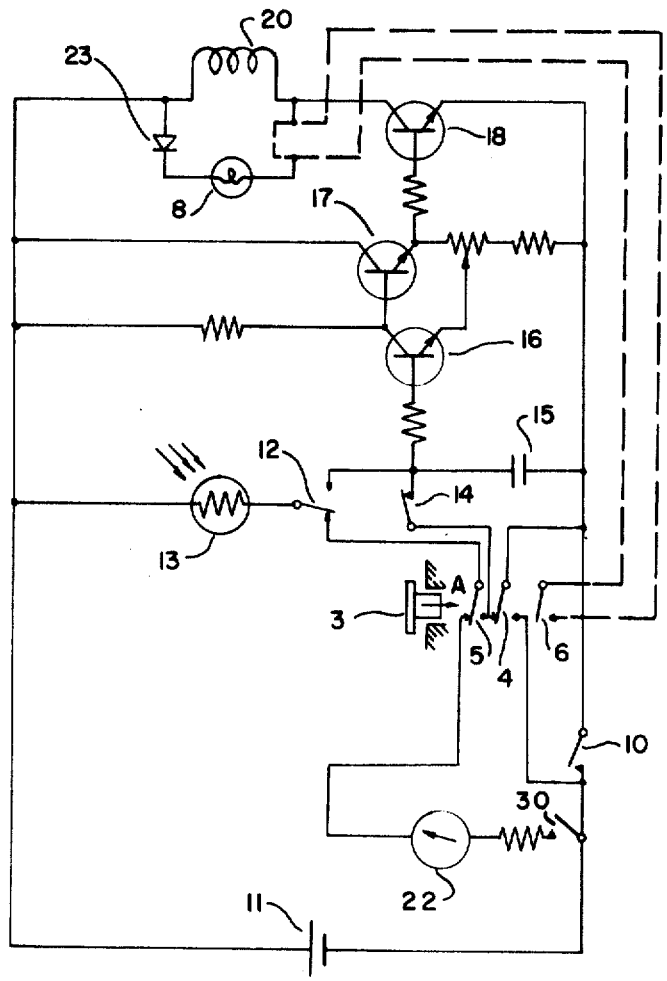
FIG. 3 shows an electronic circuit diagram comprising the control lamp and the switch according to FIG. 2 as additional circuit elements according to the invention.

By depressing the test key 3 in the direction of arrow A the changeover switches 4 and 5 in FIGS. 2 and 3 are brought into their depressed position by means of collar 3a and tenon 3b (FIG. 2). As shown in FIG. 2 the switch arms are embedded in a block of insulating material 9.

Figure 4:
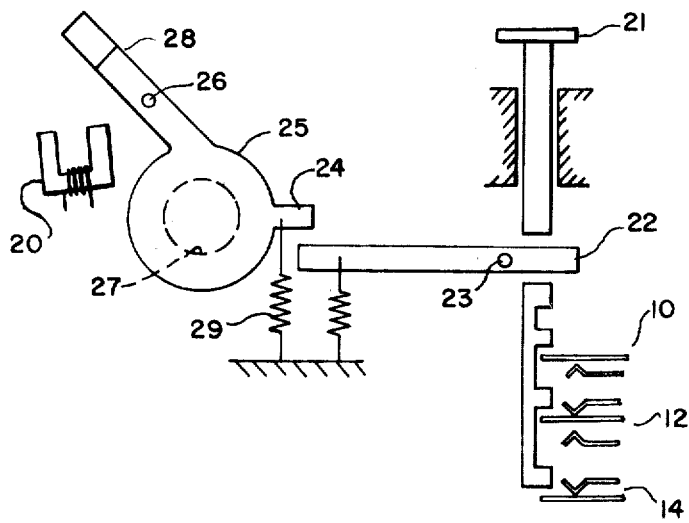
FIG. 4 is a schematic showing of the mechanical arrangement of a typical electronic shutter which could be used with the instant invention.

FIG. 4 shows the mechanical arrangement of the shutter parts. When exposure is initiated by depression of the shutter release 21, member 22 is pivoted about point 23 engaging projection 24 on shutter blade 25. Shutter blade 25 is mounted so as to pivot at point 26 when member 22 engages projection 24. Arm portion 28 of shutter blade 25 comes in contact with electromagnet 20 and exposure aperture 27 is uncovered, thus placing the shutter in its open position. If electromagnet 20 is energized, arm 28 will be held in this position until electromagnet 20 is deenergized whereupon spring 29 will return the shutter to its closed position, as shown.

FIG. 3 is based on a circuit of a conventional type in which a holding magnet 20 is connected to the battery 11 by main switch 10 upon actuation of the camera shutter release 21 (FIG. 1) for taking a photographic exposure. Changeover switch 12 is also actuated by the camera shutter release 21 so that the photoresistor 13 of the electronic device can begin regulating the buildup of charge upon capacitor 15. The mechanical part of the shutter is then released for shutter action and the short-circuiting switch 14 is opened as the release member is depressed further whereby the shutter electronics begins to integrate and the capacitor 15 is charged through the photoresistor 13. When a certain threshold value is reached at the base of transistor 16, said transistor becomes conductive and thereby causes the transistors 17 and 18 to be tripped to a nonconducting state. Consequently, holding magnet 20 is released, and the shutter closes again.

As shown in FIG. 3 the control lamp 8 is connected in parallel with holding magnet 20 through diode 23. By this arrangement the control lamp 8 is caused to be on as long as the magnet keeps the shutter open and to be off as soon as the holding magnet 20 is currentless and the shutter closed.

When the energizing current of magnet 20 is interrupted by transistor 18 being tripped off, the magnetic energy of the self-induction of magnet 20 causes it to act as a current source. Since a current path is available through signal lamp 8, the current would pass through the lamp 8 and holding magnet 20 until the magnetic energy of the self-induction is consumed, thus causing the holding magnet to be energized for a longer period of time which would thereby cause large errors when using short exposure times. In order to prevent this lengthening of energization, diode 23 is serially connected in such a way that no transient current can pass.

For the purpose of a simulated exposure process, according to the invention, as a preparation for a planned long exposure, such as of a night shot of a street illuminated by advertisements, the test key 3 is further provided in FIG. 3 with the changeover switches 4 and 5 actuated by test key 3. Upon pressing the test key 3 the changeover switch 4 assumes the function of the master switch 10 and that of the short-circuiting switch 14. The changeover switch 5 performs the function of changeover switch 12, in the position shown in FIG. 3 (camera being ready for use). The resistors being further shown in FIG. 3 are only to complete the circuit diagram, their function need not be described in this connection.

When the photographer presses the test key 3 according to the invention, the shutter electronics integrates in the same way as for an actual exposure; however, since the shutter has not been opened, energization of magnet 20 produces no effect except than that lamp 8 is on for the duration of the exposure time to be expected.

The measuring device 22 is not a part of the subject invention. The device 22 is adapted to provide an analog representation of the anticipated exposure time, which is determined as a function of the level of illumination incident on the photoresistor 13 when a switch 30 is closed to actuate the device. Such a measuring device enables a camera operator to determine whether the camera can be hand-held or should be supported on a tripod for best results under existing lighting conditions.

FIG. 3 further shows, in broken lines, an alternative arrangement for controlling actuation of the lamp 8. In this embodiment a switch 6, actuatable by the test key 3 is provided in series with the lamp 8 so that the lamp is energized only upon actuation of the test key 3, but not upon actuation of the camera release as in the preferred embodiment.

When the shutter is normally actuated by the camera release member 21 the switch 6 stays open so that the signal lamp 8 cannot burn. This modified arrangement makes the diode 23 superfluous.

The invention has been described in detail with particular reference to a preferred embodiment thereof, but it will be understood that variations and modifications can be effected within the spirit and scope of the invention.

I claim:

1. In a camera adapted to expose film to scene light through an exposure aperture, an exposure control apparatus comprising:
   a. photoresponsive means adapted to receive illumination from an object scene for varying an electrical parameter as a function of the level of scene illumination incident thereon;
   b. activatable time-delay circuit means including said photoresponsive means for producing a control signal a period of time after activation thereof, said time-delay circuit means including means for establishing the time period as a function of said electrical parameter;
   c. actuatable shutter means for covering and uncovering the exposure aperture;
   d. means for actuating said shutter means to uncover said exposure aperture to initiate an exposure interval;
   e. first means for activating said time-delay circuit means in synchronization with the actuation of said shutter means to initiate an exposure interval;
   f. means for actuating said shutter means to cover said exposure aperture in response to said control signal;
   g. an electrical indicator coupled to said time-delay circuit means and actuatable to indicate the end of an exposure interval in response to said control signal; and
   h. second means for activating said time-delay circuit means independently of the actuation of said shutter means to enable actuation of said electrical indicator without effecting an exposure.

2. In a camera adapted to expose film to scene light through an exposure aperture, an exposure control apparatus comprising:
   a. photoresponsive means adapted to receive illumination from an object scene for varying an electrical parameter as a function of the level of scene illumination incident thereon;
   b. activatable time-delay circuit means including said photoresponsive means for producing a control signal a period of time after activation thereof, said time-delay circuit means including means for establishing the time period as a function of said electrical parameter;
   c. actuatable shutter means for covering and uncovering the exposure aperture;
   d. means for actuating said shutter means to uncover said exposure aperture to initiate an exposure interval;
   e. first means for activating said time-delay circuit means in synchronization with the actuation of said shutter means to initiate an exposure interval;
   f. means for actuating said shutter means to cover said exposure aperture in response to said control signal;
   g. an electrical indicator coupled to said time-delay circuit means and actuatable to indicate the end of an exposure interval in response to said control signal; and
   h. second switch means manually actuatable to activate said time-delay circuit means independently of the actuation of said shutter means to enable actuation of said electrical indicator without effecting an exposure.

3. In a camera adapted to expose film to scene light through an exposure aperture, an exposure control apparatus comprising:
   a. photoresponsive means adapted to receive illumination from an object scene for varying an electrical parameter as a function of the level of scene illumination incident thereon;
   b. activatable, integrating circuit means including said photoresponsive means for producing an output voltage that varies when activated from a first predetermined level to a second predetermined level over a period of time that is a function of the level of illumination incident on said photoresponsive means;
   c. a voltage-sensing trigger circuit coupled to said output of said integrating circuit means, said trigger circuit being adapted to switch from a first state to a second state when said output voltage reaches said second predetermined level;
   d. actuatable shutter means for covering and uncovering the exposure aperture;
   e. means for actuating said shutter mechanism to uncover said exposure aperture to initiate an exposure interval;
   f. first switch means for activating said integrating circuit means in response to actuation of said shutter means to initiate an exposure interval;
   g. transducer means coupled to said trigger circuit means in response to actuation of said shutter means to initiate an exposure interval;
   g. transducer means coupled to said trigger circuit for actuating said shutter means to cover said exposure aperture in response to switching of said trigger circuit to its second state;
   h. an electrical indicator coupled to said trigger circuit and actuatable to indicate the switching of said trigger circuit to its second state; and
   i. second switch means manually actuatable to activate said integrating circuit means independently of the actuation of said shutter means to enable actuation of said electrical indicator without effecting an exposure.

PO-1050
(5/69)

UNITED STATES PATENT OFFICE
CERTIFICATE OF CORRECTION

Patent No. 3,581,634        Dated June 1, 1971

Inventor(s) Wolfgang Ort

It is certified that error appears in the above-identified patent and that said Letters Patent are hereby corrected as shown below:

Col. 1-line 69   delete "electric", and insert --electronic--.

Col. 4-line 57-59   delete 1st subparagraph (g)

Signed and sealed this 21st day of December 1971.

(SEAL)
Attest:

EDWARD M.FLETCHER,JR.      ROBERT GOTTSCHALK
Attesting Officer           Acting Commissioner of Patents